UNITED STATES PATENT OFFICE.

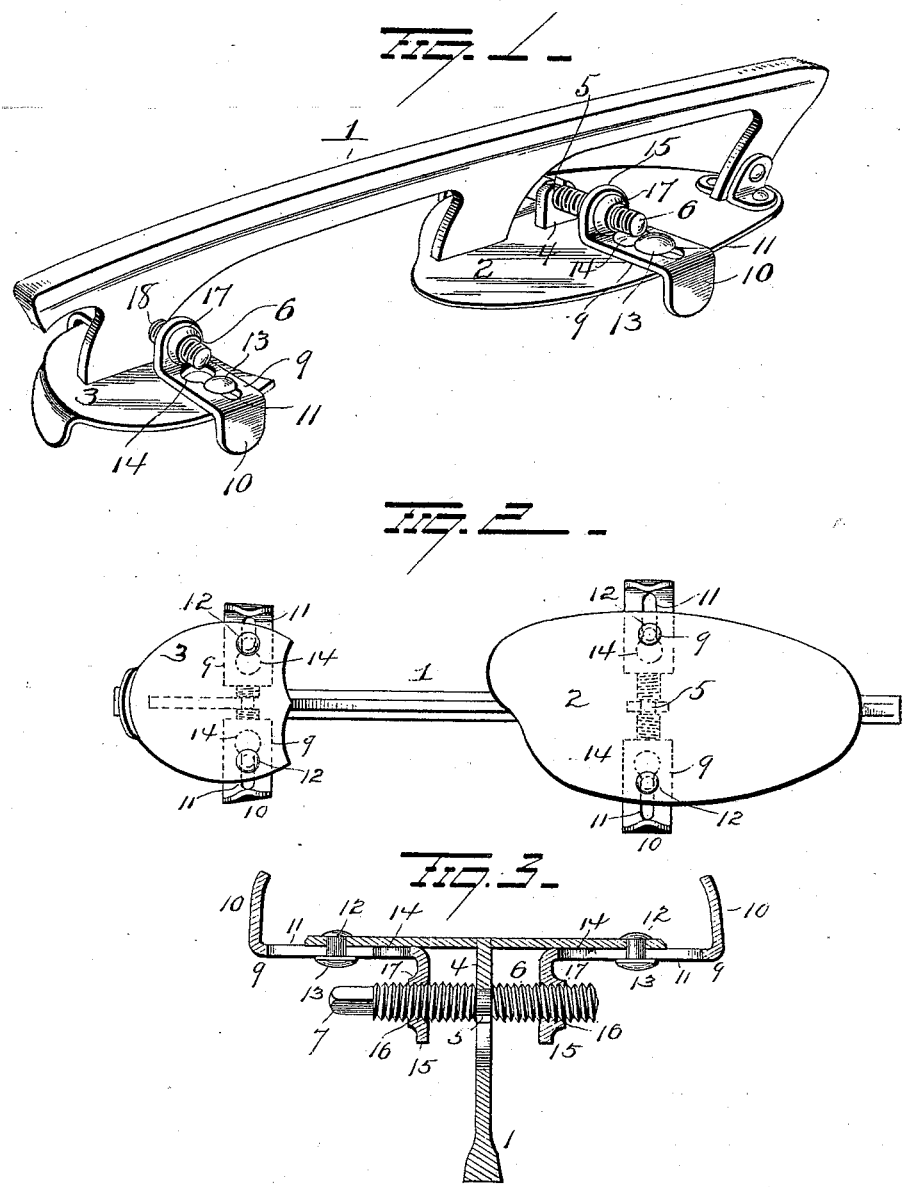

THOMAS W. BRYANT, OF TORRINGTON, CONNECTICUT.

SKATE.

SPECIFICATION forming part of Letters Patent No. 622,838, dated April 11, 1899.

Application filed October 31, 1898. Serial No. 695,092. (No model.)

*To all whom it may concern:*

Be it known that I, THOMAS W. BRYANT, a resident of Torrington, in the county of Litchfield and State of Connecticut, have invented certain new and useful Improvements in Skates; and I do hereby declare the following to be a full, clear, and exact description of the invention, such as will enable others skilled in the art to which it appertains to make and use the same.

My invention relates to an improvement in skates, the object of the invention being to provide an adjustable clamp for a skate which can be adjusted to accommodate different sizes and shapes of shoes and which can be readily removed for purposes of repair or substitution of new parts for old, broken, or incapacitated.

A further object is to provide a clamp for skates which will be neat in appearance, extremely cheap to manufacture and assemble, and which can be operated to most effectually clamp a skate to the shoe.

With these objects in view the invention consists in certain novel features of construction and combinations and arrangements of parts, as will be more fully hereinafter described, and pointed out in the claims.

In the accompanying drawings, Figure 1 is a side view, Fig. 2 is a plan view, and Fig. 3 is a view in section, illustrating my improvements.

1 represents the runner, 2 the sole-plate, and 3 the heel-plate, of a skate of ordinary construction.

A downwardly-projecting lug 4 is secured centrally to the sole-plate 2, and said lug 4 is recessed at its lower end for the reception of a non-threaded portion 5 of a screw 6. The screw 6 is provided at one side of the non-threaded portion 5 with right-hand threads and at the other side with left-hand threads, and the end of said screw 6 is elongated and made angular, as shown at 7, for the reception of any suitable tool for turning same.

Clamps 9, of sheet metal, are disposed one on each side of the sole-plate 2 and are bent upward at their outer ends, as shown at 10, to grasp the sole of the shoe when clamped thereto. The clamps 9 are disposed on the lower face of the sole-plate 2, and each clamp is provided with an elongated slot 11 for the reception of a rivet 12, secured to the sole-plate 2 and having a head 13 on its end, whereby to guide said clamps and insure their proper position relative to the sole-plates. The slot 11 in each clamp is enlarged at its inner end, as shown at 14, to permit the clamp to be lifted over the head of the rivet when it is desired to adjust the clamps to accommodate different-shaped shoes or to repair or replace the clamps. Each clamp is provided on its inner end with a downwardly-projecting arm 15, formed by bending the end of the clamp at right angles, and each arm is provided with a screw-threaded hole or opening 16 for the reception of one end of the screw 6. The opening 16 in one of the clamps is provided with right-hand threads to correspond with the threads on one end of the screw 6, and the opening 16 in the other clamp is provided with left-hand threads to correspond with the threads on the other end of the screw, whereby when the screw is turned in one direction it will operate to force the clamps apart and when turned in the other direction to draw them toward each other.

In order to admit of a strong thread being formed in the sheet-metal arms 15 of the clamps, I punch the holes in said arms and then draw the metal to extend the screw-threaded bearings for the screw 6. Enlargements 17 will be thus formed around the openings 16 in the clamps.

The clamps for the heel-plate are made precisely like the clamps for the sole-plate with the exception that in the heel-plate I dispense with the lug 4 and provide a recess 18 in one edge of the bent-up portion of the runner 1, as shown, and hence it will be unnecessary to describe same more in detail.

It will be seen that with my improved clamp when it is desired to clamp a shoe having a peculiar-shaped sole with a greater width from the center of the foot on one side than the other it is simply necessary to unscrew the screw 6 until the clamps 9 have reached their extreme outward position, when the enlarged end 14 of the slot 11 will permit of the easy removal of one of the clamps. One of the clamps is then screwed up on one end of the screw 6 for a certain distance, and then the other clamp will be started on the other end of the screw. When the clamps are thus disposed on the screw, it will be seen that one of them—viz., the one started last on the screw—will extend outward a greater distance from the center of the sole-plate than the other, and hence will accommodate a peculiar-shaped sole and at the same time insure the location of the runner 1 centrally under the foot. It will also be seen that with my improved clamp should a clamp become broken or bent it is simply necessary to unscrew the clamp until the enlarged portion 14 of the slot 11 is in alinement with the rivet 12, when the injured clamp can be readily removed and repaired or a new one substituted therefor.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a skate, of a screw swiveled thereto and having right and left hand threads at respective sides of its connection with the skate, two clamps disposed in alinement with each other and provided with depending lugs having screw-threaded holes for the passage of said screw, said clamps each having a straight elongated slot, the inner end of which is enlarged, and headed pins depending from the skate and projecting through said elongated slots to adjustably support the clamps, and to permit an adjustment of one clamp relatively to the other on the screw, substantially as set forth.

2. A clamp for a skate consisting of a single piece of sheet metal bent at one end to form an arm to engage the sole of a shoe and bent in the opposite direction at the other end to form a downwardly-projecting arm having a transverse screw-threaded hole, the metal surrounding said hole being distended to increase the length of the hole beyond the thickness of the sheet metal.

In testimony whereof I have signed this specification in the presence of two subscribing witnesses.

THOMAS W. BRYANT.

Witnesses:
H. A. HALL,
W. A. RUSSELL.